United States Patent
Simon et al.

(10) Patent No.: US 9,182,076 B2
(45) Date of Patent: Nov. 10, 2015

(54) TOUCH ENTRY DISPLAY MOUNT

(71) Applicants: Trevor Simon, Lake Forest, CA (US);
Daniel Shin Kim, Sacramento, CA (US)

(72) Inventors: Trevor Simon, Lake Forest, CA (US);
Daniel Shin Kim, Sacramento, CA (US)

(73) Assignee: RUSS BASSETT CORPORATION,
Whittier, CA (US)

( * ) Notice: Subject to any disclaimer, the term of this patent is extended or adjusted under 35 U.S.C. 154(b) by 81 days.

(21) Appl. No.: 14/058,235

(22) Filed: Oct. 19, 2013

(65) Prior Publication Data

US 2015/0108307 A1   Apr. 23, 2015

(51) Int. Cl.
*F16M 13/00* (2006.01)
*F16M 13/02* (2006.01)
*F16M 11/18* (2006.01)
*F16M 11/06* (2006.01)

(52) U.S. Cl.
CPC ............ *F16M 13/022* (2013.01); *F16M 11/06* (2013.01); *F16M 11/18* (2013.01); *F16M 13/02* (2013.01)

(58) Field of Classification Search
CPC ..... F16M 13/022; F16M 13/02; F16M 11/06; F16M 11/18
USPC .................................................. 248/231.81
See application file for complete search history.

(56) References Cited

U.S. PATENT DOCUMENTS

| | | | |
|---|---|---|---|
| 5,108,063 A * | 4/1992 | Koerber et al. | 248/284.1 |
| 5,695,078 A * | 12/1997 | Otema | 211/103 |
| 5,775,521 A * | 7/1998 | Tisbo | 211/94.01 |
| 6,349,436 B1 * | 2/2002 | Kreuzer | 5/600 |
| 6,434,329 B1 * | 8/2002 | Dube et al. | 396/14 |
| 6,578,498 B1 * | 6/2003 | Draudt et al. | 108/50.02 |
| 6,712,433 B2 * | 3/2004 | Hellwig et al. | 312/223.6 |
| 6,811,043 B2 * | 11/2004 | Perkins et al. | 211/94.01 |
| 7,228,977 B2 * | 6/2007 | Perkins et al. | 211/94.01 |
| 7,410,138 B2 * | 8/2008 | Parsons | 248/278.1 |
| 8,051,610 B2 * | 11/2011 | Chance | 52/36.1 |
| 8,267,363 B2 * | 9/2012 | Begic et al. | 248/221.11 |
| 8,393,585 B2 | 3/2013 | Han et al. | |
| 8,528,752 B2 * | 9/2013 | Bowser et al. | 211/90.02 |
| 8,684,325 B1 * | 4/2014 | Beshara | 248/281.11 |
| 8,800,454 B2 * | 8/2014 | Jones | 108/10 |
| 8,834,489 B2 * | 9/2014 | Cooper et al. | 606/130 |
| 2004/0164220 A1 * | 8/2004 | Newkirk | 248/647 |
| 2004/0199996 A1 * | 10/2004 | Newkirk et al. | 5/81.1 R |
| 2013/0206944 A1 * | 8/2013 | Merck et al. | 248/309.1 |

* cited by examiner

*Primary Examiner* — Mark Wendell
(74) *Attorney, Agent, or Firm* — Kenneth L. Green; Averill & Green

(57) ABSTRACT

A display mount is attached to a slatwall using an improved slatwall hanger. The display mount includes vertically pivoting arms providing forward and rearward movement of the display with only slight vertical movement. The slatwall hanger is attached to the slatwall by sandwiching at least one vertical face of a slat between a cover and a clamping member. The cover includes at least one outer lip residing against the front of the vertical face and the clamping member includes at least one inner lip residing against the rear of the vertical face. The clamping member is biased away from the cover by a spring to facilitate insertion of the inner lips between open spaces between consecutive slats. Screws connect the clamping member to the cover and are tightened to grasp the vertical slat face between the lips.

19 Claims, 14 Drawing Sheets

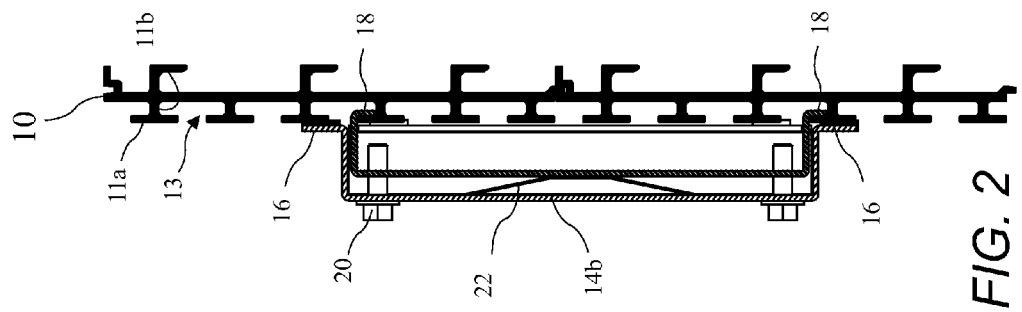
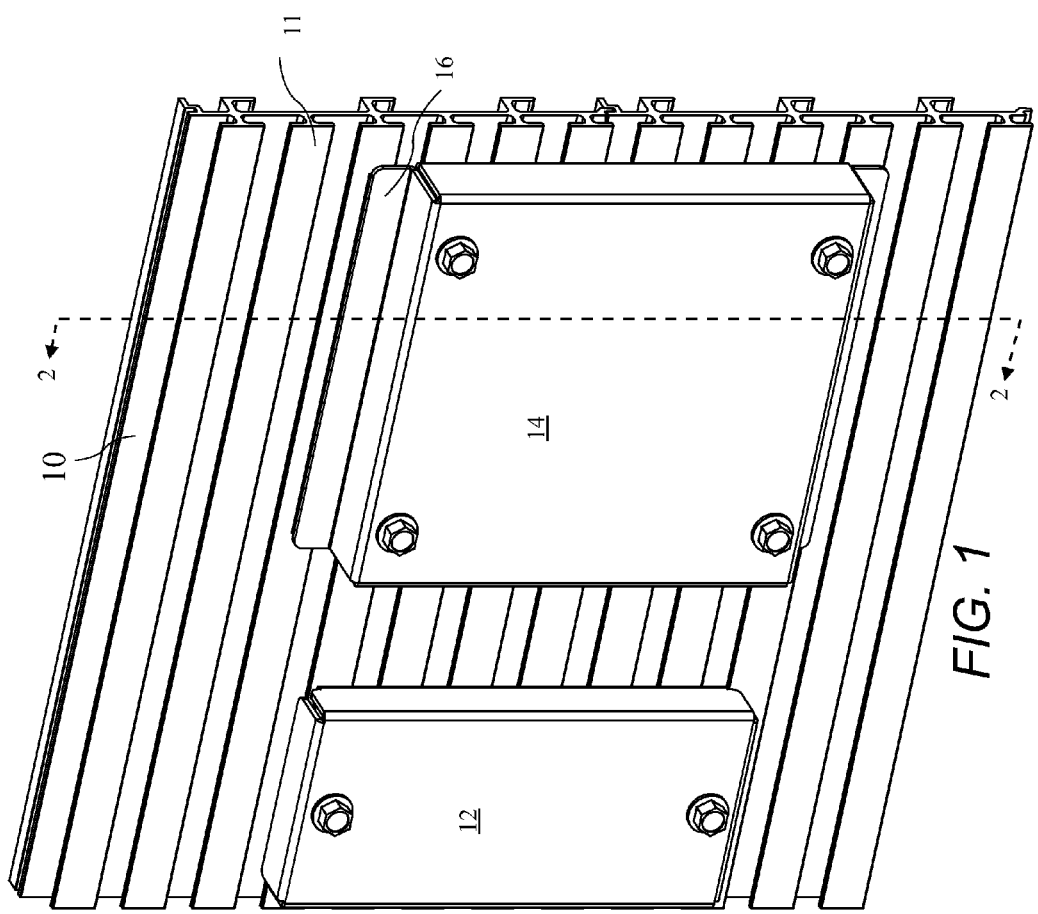

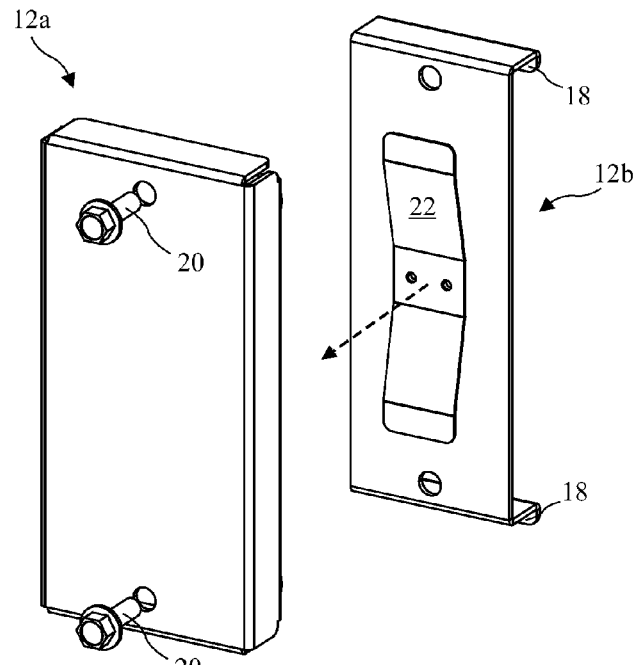
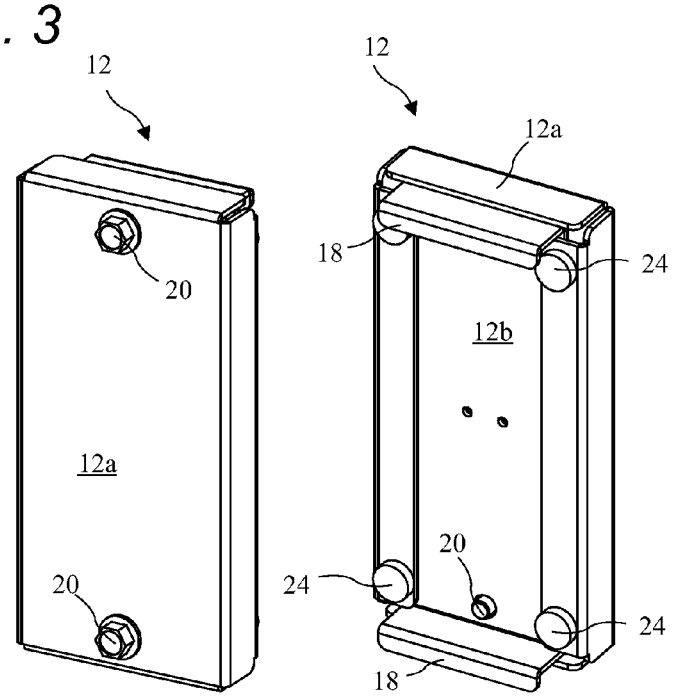

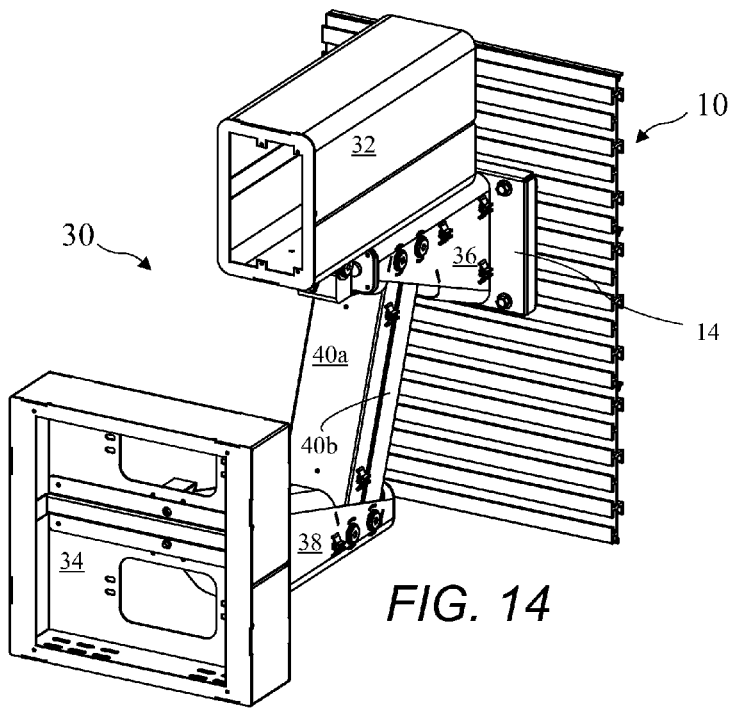
FIG. 14
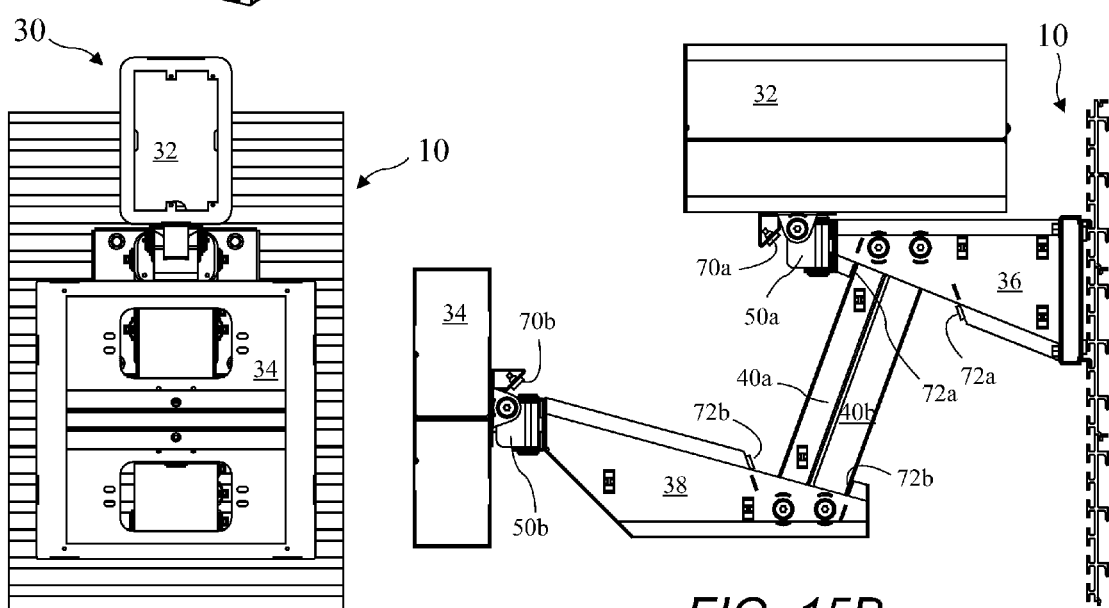
FIG. 15A
FIG. 15B

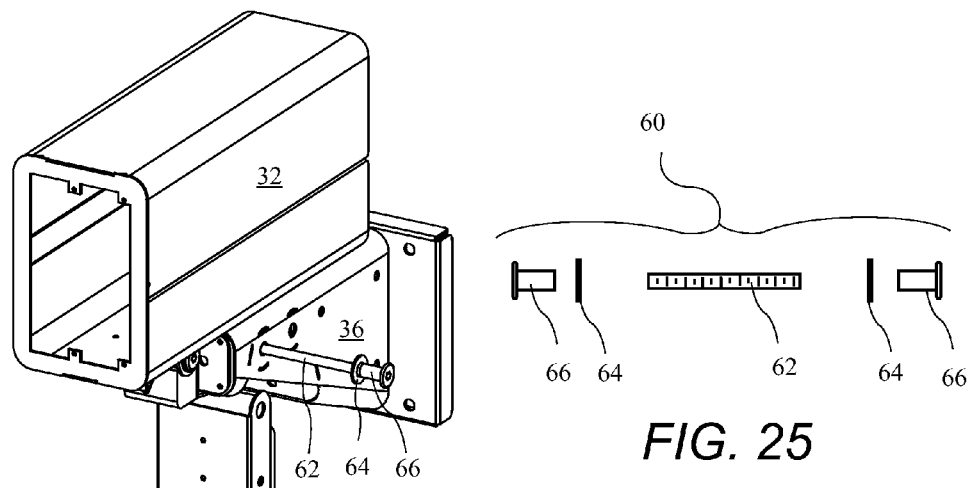
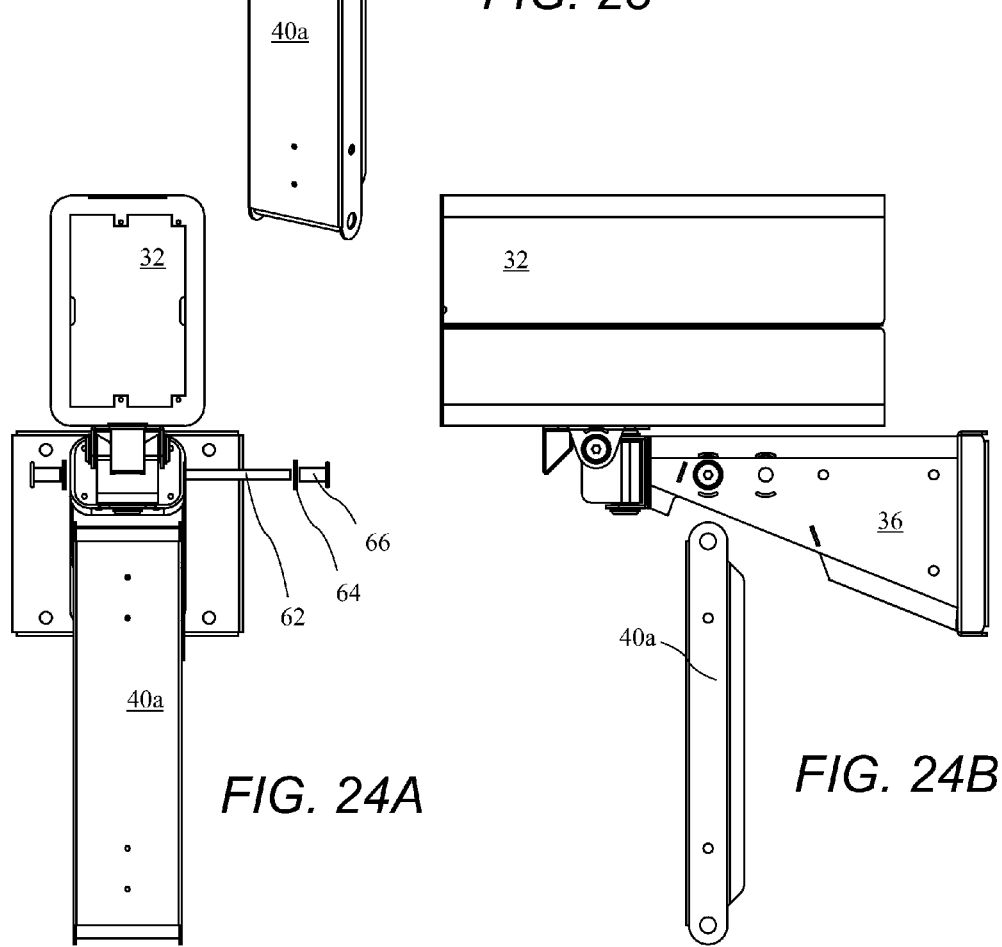

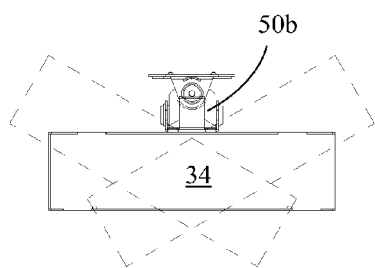
FIG. 26D
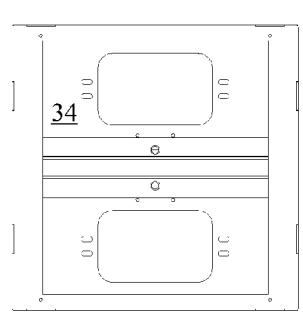 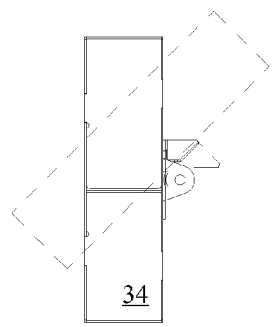 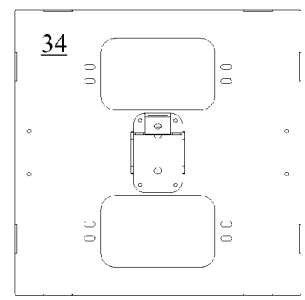
FIG. 26A     FIG. 26B     FIG. 26C

TOUCH ENTRY DISPLAY MOUNT

BACKGROUND OF THE INVENTION

The present invention relates to display mounts and in particular to an improved display mount including an improved load bearing slatwall equipment hanger.

In some control center environments, visual access to displays is critical in performing vital functions. Display mounts must provide adjustment for the best viewing positions to minimize fatigue. Known monitor mounts include stacked pivoting arms which provide movement in literally any direction. In some applications there is a desire to restrict movement to in-out for the arm while maintaining a tilt/pivot motion of the monitor. Such in-out motion could be achieved using a parallel horizontal arm structure. Unfortunately, parallel horizontal arms cannot efficiently support the weight of some monitors.

Other known display mounts include slides for forward and rearward motion. At full extension such slides have reduced rigidity and may bind or fail. Additionally, sliding mounts require two slides for stability, much like a drawer would have. The two slides on a carriage may feel reasonably stable in the closed position, but as the slides approach the extended position there is excessive lateral instability and there is nothing forcing the slides to extend synchronously, and a slide mount which requires a short compressed length has poor stability when extended.

Further, display mounts are often mounted to a slatwall and are attached to the slatwall using equipment hangers and clamps. Such slatwalls comprises a multiplicity of vertically spaced apart parallel horizontal slats (e.g., "T" shaped features). The slatwall hangers may include either an offset which hooks in and up, or a "J" that hooks in and down. The slatwall provides an easily reconfigurable mounting system with simple addition, removal, and adjustment of hangers.

Some equipment requires clamping the hangers to the slatwall to fix the hanger position preventing the easy movement of the hangers. Known slatwall clamps reach above a higher slat and below a lower slat, and are drawn together to clamp the hanger to the slatwall. While this provides an effective method of securing the hanger, because the vertically opposed clamps are drawn together, the amount of vertical force exerted on the slats may be excessive, causing stress on a horizontal portion of the slat, and sometimes breaking the slat even before any load is applied by the hanger.

With very heavy loads and long lever arms, the stress on the slat can be excessive. This coupled with the stress from the opposing clamps makes the slat the weak link in the assembly.

Because installations may require a large number of hangers, clamps and clips to be attached to the slatwall, the horizontal portion of the slats can not be made thicker. Therefore, a need exists for a hanger which reduces that stress on a standard slatwall structure.

BRIEF SUMMARY OF THE INVENTION

The present invention addresses the above and other needs by providing a display mount which is attached to a slatwall using an improved slatwall hanger. The display mount includes vertically pivoting arms providing forward and rearward movement of the display with only slight vertical movement. The slatwall hanger is attached to the slatwall by sandwiching at least one vertical face of a slat between a cover and a clamping member. The cover includes at least one outer lip residing against the front of the vertical face and the clamping member includes at least one inner lip residing against the rear of the vertical face. The clamping member is biased away from the cover by a spring to facilitate insertion of the inner lips between open spaces between consecutive slats. Screws connect the clamping member to the cover and are tightened to grasp the vertical slat face between the lips.

In accordance with one aspect of the invention, there is provided a Touch Entry Device (TED) mount having parallel pivoting on horizontal axles providing maximum stability and minimizing the mounting envelope and provide a tighter compressed length than slides. The parallel arms pivot in a vertical plane from a rearward reposition, to a vertical position, to a forward position, holding a moveable carrier parallel to a fixed hanger. The arms pivot through small angles minimizing vertical carrier motion while providing adequate horizontal motion. The weight of the arms, carrier, and monitor applies torque to pin and sleeve assemblies of the horizontal axle pairs pushing to each pin and sleeve of each axle pair to opposite sides creating rotational friction in the axles, rather than sliding friction, provides a rigid yet smooth feel through the stroke.

In accordance with another aspect of the invention, there is provided a TED mount having arms only slightly wider than the pivoting mechanism in order to rotate a monitor without interference. The horizontal axles allow having an arm width only limited by the mounting envelope. Vertical axles would allow a greater vertical size, but would require a narrower arm width. The wider arm allowed by the horizontal axle provides better left-to-right stability and the geometry of the arms provides more than adequate vertical stability because the weight of the assembly, including the monitor, is holding the parallel arm in a rested position.

In accordance with yet another aspect of the invention, there is provided a TED mount having arms comprising opposing C-channels which partially overlapping but do not touch. The C-channel arm design provides greater strength than blades, overlap to eliminate pinch points, and are opposing to create a closed box look. The front arm includes inset lips which enter the rear arm, allowing the front arm to ride inside the rear arm, and eliminating pinch points. As the arms swing their separation changes, but the inset lips fill the gap over the range of arm motion. The inset lips of the front arm allows the bodies of the front and rear arms to be the same width and use the same pivot hardware used with the other axles of the TED mount, and still closes off the box, eliminating the pinch points.

In accordance with still another aspect of the invention, there is provided a TED mount having a hanger and carrier which are closed boxes for strength and aesthetics, and include ribs which provide stops to limit forward and rearward motion of the arms.

In accordance with another aspect of the invention, there is provided a TED mount having a triangular shaped hanger to act as a gusset, maximizing strength at the TED mount while minimizing the vertical height at the front where the equipment boxes are pivoting.

In accordance with yet another aspect of the invention, there is provided a TED mount having a hanger and carrier including reliefs cut into the hanger and carrier above and below the axles. The reliefs allow the interior dimensions of the hanger and carrier to be somewhat greater than the axle sleeves while allowing axle attachment portions of the hanger and carries to be compressed against the sleeves when the axle bolts are tightened—eliminating the twisting of the hanger and carrier which would otherwise occur.

In accordance with another aspect of the invention, there is provided a TED mount having rotating cable ties. The rotating ties allow cables to rotate when the carrier is moved to reduce stress on the cables.

In accordance with another aspect of the invention, there is provided a slatwall hanger which eliminate stress created by known clamp on hangers. The slat wall hanger includes opposing inner and outer lips which sandwich vertical faces of the slats and do not apply vertical forces to the slats. The inner lips are inserted between the vertical slat members and dropped into position behind the vertical slat members. The inner and outer lips are then drawn together to horizontally sandwich the vertical slat members, applying no vertical clamping force on the slats. Such sandwiching the vertical slat members eliminates of the stress on the slat that's associated with the known clamping action. As a result, the slats can carry more weight without making the slats physically larger to increase strength, with a resulting loss in the number of hangers which may be attached to the slatwall.

In accordance with another aspect of the invention, there is provided a slatwall hanger which sandwiches the vertical slat members between inner and outer lips rather than grasping vertically spaced apart slats. Rubber bumpers and/or rubber stick-on pads are attached to the outer lips to protect vertical faces of the slats from scratches.

In accordance with still another aspect of the invention, there is provided a slatwall hanger having inner and out lips biased apart. In order to engage the slatwall, the inner lip has to be pushed inward between adjacent slats. The larger the slatwall hanger, the more difficult this installation method is. To improve the ease of installation, a spring is incorporated biasing the inner and outer lips apart, making it easier to engage the slatwall hanger with the slatwall. After positioning the slatwall hanger on the slatwall, the lips are drawn together using screw, levers, or other mechanical apparatus.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a perspective view of a slat wall and two embodiments of controlled stress hangers according to the present invention.

FIG. 2 is a cross-sectional view of the second embodiment of the controlled stress hanger according to the present invention taken along line 2-2 of FIG. 1.

FIG. 3 shows cover and clamping members of the first embodiment of the controlled stress hanger according to the present invention.

FIG. 4A shows a front view of the first embodiment of the controlled stress hanger according to the present invention.

FIG. 4B shows a rear view of the first embodiment of the controlled stress hanger according to the present invention.

FIG. 14 is a perspective view of the TED mount according to the present invention in a forward position.

FIG. 15A is a front view of the TED mount according to the present invention in a forward position.

FIG. 15B is a side view of the TED mount according to the present invention in a rearward forward position.

FIG. 23 is a perspective view of the carrier, the equipment box, the front pivot arm, and a front arm pivot axle of the TED mount according to the present invention.

FIG. 24A is a front view of the carrier, the equipment box, the front pivot arm, and the front arm pivot axle of the TED mount according to the present invention.

FIG. 24B is a side view of the carrier, the equipment box, the front pivot arm, and the front arm pivot axle of the TED mount according to the present invention.

FIG. 26A is a front view of a display housing according to the present invention.

FIG. 25 is a detailed view of an adjustable axle according to the present invention.

FIG. 26B is a side view of the display housing and pivot block according to the present invention.

FIG. 26C is a rear view of the display housing and pivot block according to the present invention.

FIG. 26D is a top view of the display housing and pivot block according to the present invention.

Corresponding reference characters indicate corresponding components throughout the several views of the drawings.

DETAILED DESCRIPTION OF THE INVENTION

Figure 5:
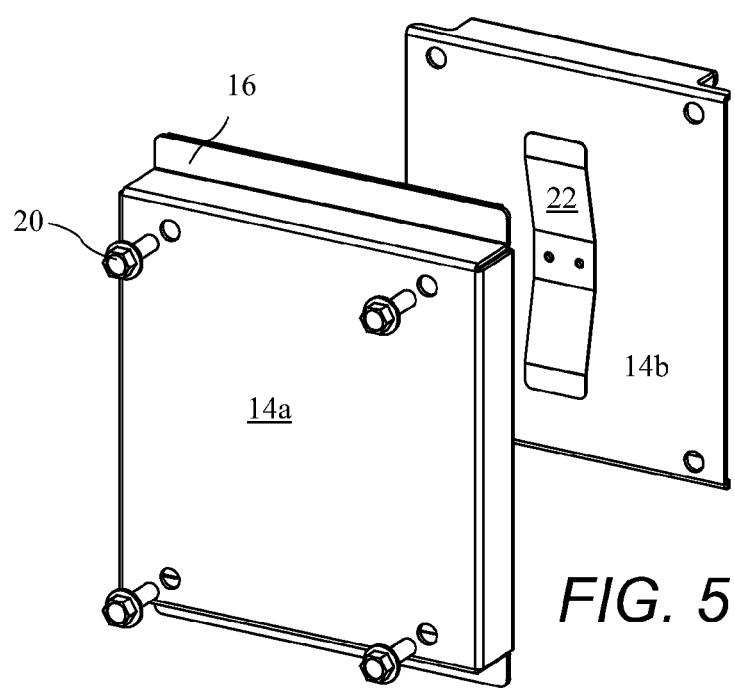
FIG. 5 shows cover and clamping members of the second embodiment of the controlled stress hanger according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective view of a slat wall 10 and two embodiments of controlled stress hangers 12 and 14 according to the present invention are shown in FIG. 1, and a cross-sectional view of the slatwall 10 and the controlled stress hanger 14 taken along line 2-2 of FIG. 1 is shown in FIG. 2. The slatwall 10 includes a multiplicity of parallel vertically spaced apart slats 11. Each slat 11 includes a vertical face 11a and a horizontal standoff 11b. Open spaces 13 between consecutive slats 11 allow attachment of the controlled stress hangers 12 and 14 to the slat wall 10. The controlled stress hangers 12 and 14 include outer and inner lips 16 and 18 respectively which sandwich the vertical faces 11a of the slats 11 to attach the controlled stress hangers 12 and 14 to the slatwall 10. Such attachment does not create vertical clamping forces on the slats 11, which when combined with the weight of accessories attached to the controlled stress hangers 12 and 14, may damage the slats 11.

A separated cover 12a and clamping member 12b of the controlled stress hanger 12 are shown in FIG. 3, a front view of the controlled stress hanger 12 is shown in FIG. 4A, and a rear view of the controlled stress hanger 12 is shown in FIG. 4B. The biasing spring 22 is attached to the clamping member 12b and resides between the cover 12a and clamping member 12b biasing the cover 12a and clamping member 12b apart. The biasing spring 22 may also be attached to the cover 12a. Such biasing separates the inner and outer lips 16 and 18 during positioning of the controlled stress hanger 12 on the slatwall 10. The spring 22 may be a leaf spring, a coil spring, any compressible material which biases the cover 12a and clamping member 12b apart which may be compressed to allow sandwiching (or clamping) the vertical face 11 between the inner and outer lips 16 and 18 to attach the controlled stress hanger 12 to the slatwall.

Figure 6A:
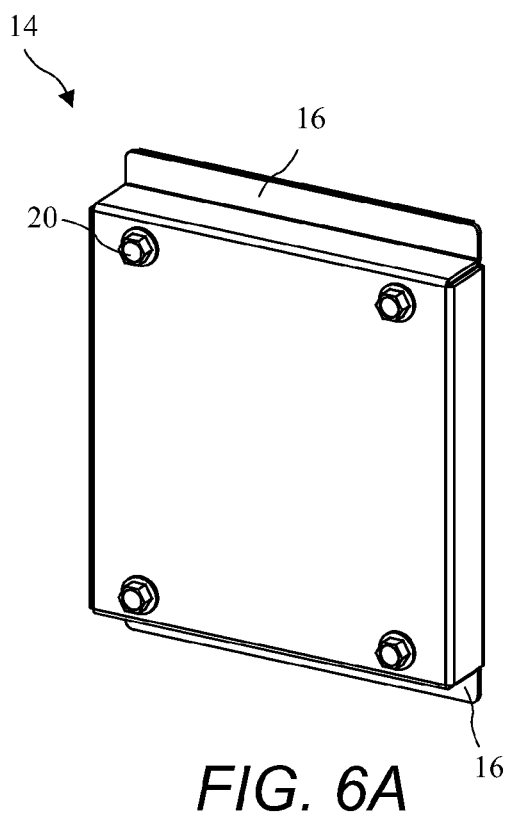
FIG. 6A shows a front view of the second embodiment of the controlled stress hanger according to the present invention.
Figure 6B:
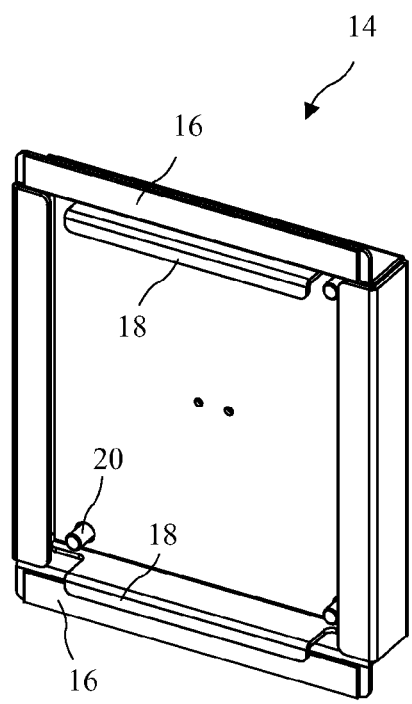
FIG. 6B shows a rear view of the second embodiment of the controlled stress hanger according to the present invention.

The cover 14a and clamping member 14b of the controlled stress hanger 14 are shown separated in FIG. 5, a front view of the controlled stress hanger 14 is shown in FIG. 6A, and a rear view of the controlled stress hanger 14 is shown in FIG. 6B. The cover 14a and clamping member 14b are attached by screws 20 or the like, and the screws 20 are tightened after the inner lips 18 are inserted between the slats 11 to attached the controlled stress hanger 14 to the slatwall 10. The controlled stress hanger 14 is thus attached by sandwiching the vertical face 11a, not by exerting vertical clamping force on vertically spaced apart slats 11.

Figure 7A:
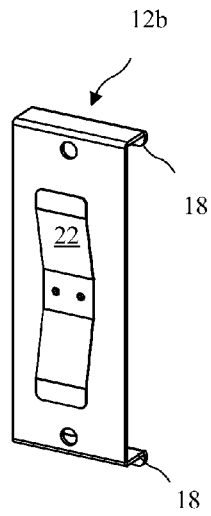
FIG. 7A shows a narrow version of the clamping member of the first embodiment of the controlled stress hanger according to the present invention.
Figure 7B:
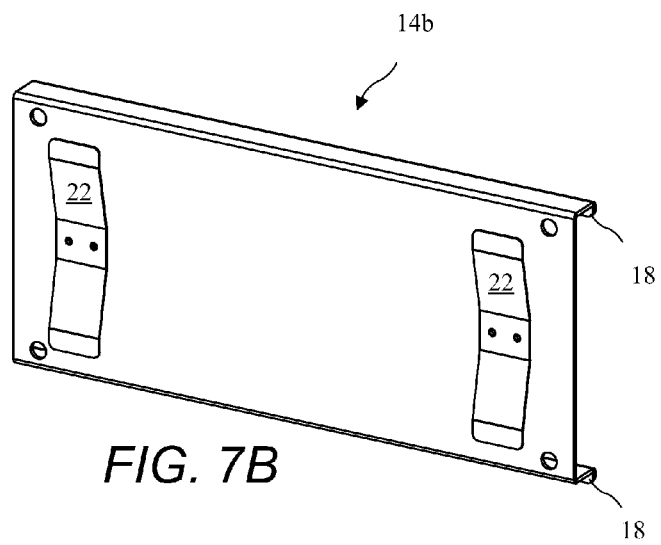
FIG. 7B shows a wide version of the clamping member of the first embodiment of the controlled stress hanger according to the present invention.
Figure 7C:
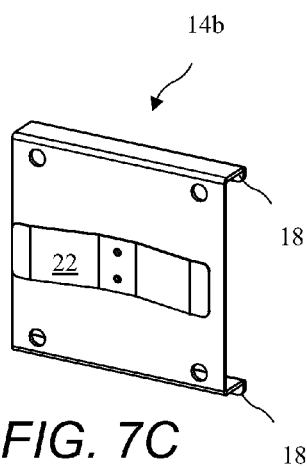
FIG. 7C shows a short version of the clamping member of the first embodiment of the controlled stress hanger according to the present invention.
Figure 7D:
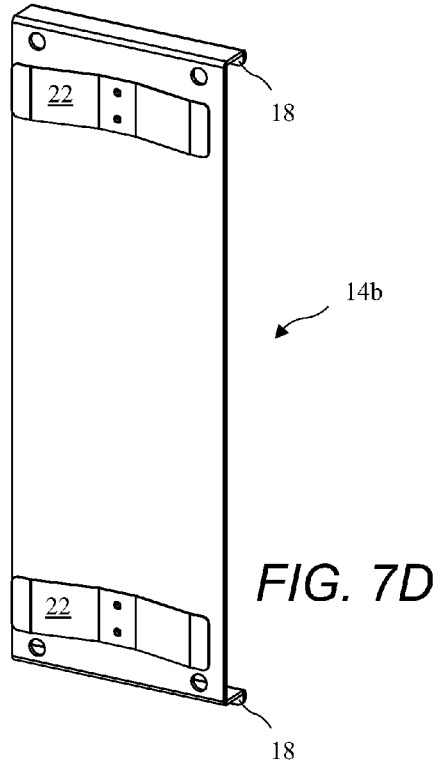
FIG. 7D shows a tall version of the cover member of the first embodiment of the controlled stress hanger according to the present invention.

A narrow version of the clamping section 12b is shown in FIG. 7A, a wide version of the clamping section 12b is shown in FIG. 7B, a short version of the clamping section 14b is shown in FIG. 7C, and a tall version of the clamping section 14b is shown in FIG. 7D. The narrow and short versions of the clamping section include a single spring 22, and the wide and tall versions of the clamping section include two single springs 22.

Figure 8A:
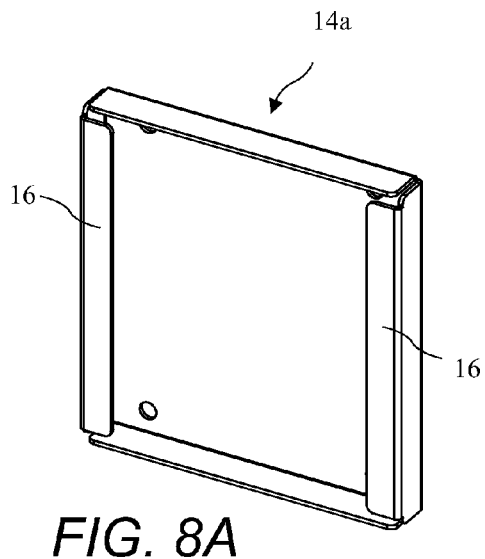
FIG. 8A shows a cover member of the second embodiment of the controlled stress hanger according to the present invention having inward reaching vertical right and left outer lips according to the present invention.
Figure 8B:
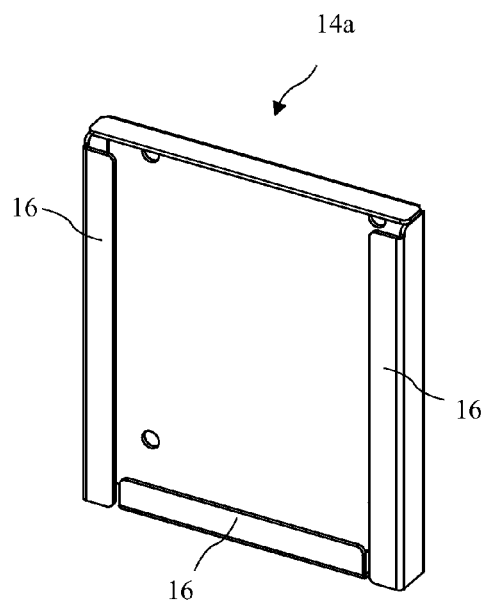
FIG. 8B shows a cover member of the second embodiment of the controlled stress hanger according to the present invention having the inward reaching vertical right and left outer lips and an inward reaching bottom inner lip according to the present invention.
Figure 8C:
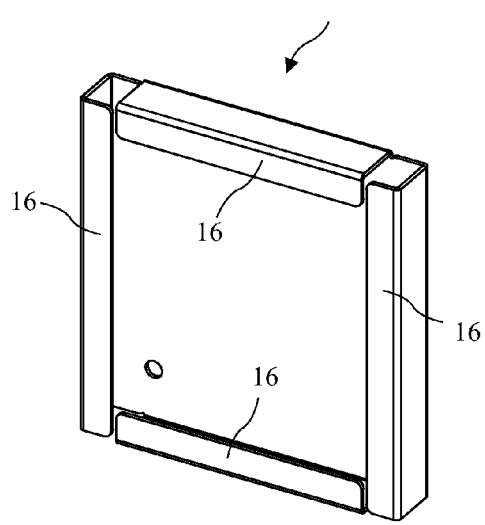
FIG. 8C shows a cover member of the second embodiment of the controlled stress hanger according to the present invention having the inward reaching vertical right and left outer lips and the inward reaching bottom inner lip and an inward reaching top inner lip according to the present invention.
Figure 8D:
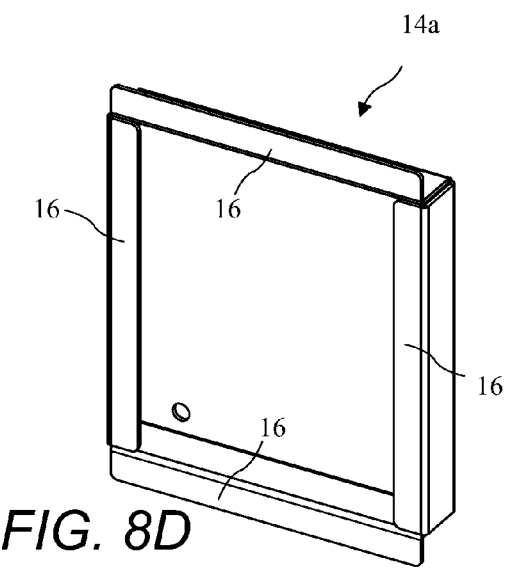
FIG. 8D shows a cover member of the second embodiment of the controlled stress hanger according to the present invention having the inward reaching vertical right and left outer lips and outward reaching top and bottom outer lips according to the present invention.

A cover member 14a of the controlled stress hanger 14 having inward reaching vertical right and left outer lips 16 is shown in FIG. 8A, a cover member 14a having the inward reaching vertical right and left outer lips 16 and an inward reaching bottom outer lip 16 is shown in FIG. 8B, a cover member 14a having the inward reaching vertical right and left outer lips 16 and the inward reaching bottom outer lip 16 and an inward reaching top outer lip 16 is shown in FIG. 8C, and a cover member 14a having the inward reaching vertical right and left outer lips 16 and outward reaching top and bottom outer lips 16 is shown in FIG. 8D. The various configurations of outer lips are generally interchangeable, but some may be preferred in specific embodiments of the present invention.

Figures 9A, 9B, 9C:
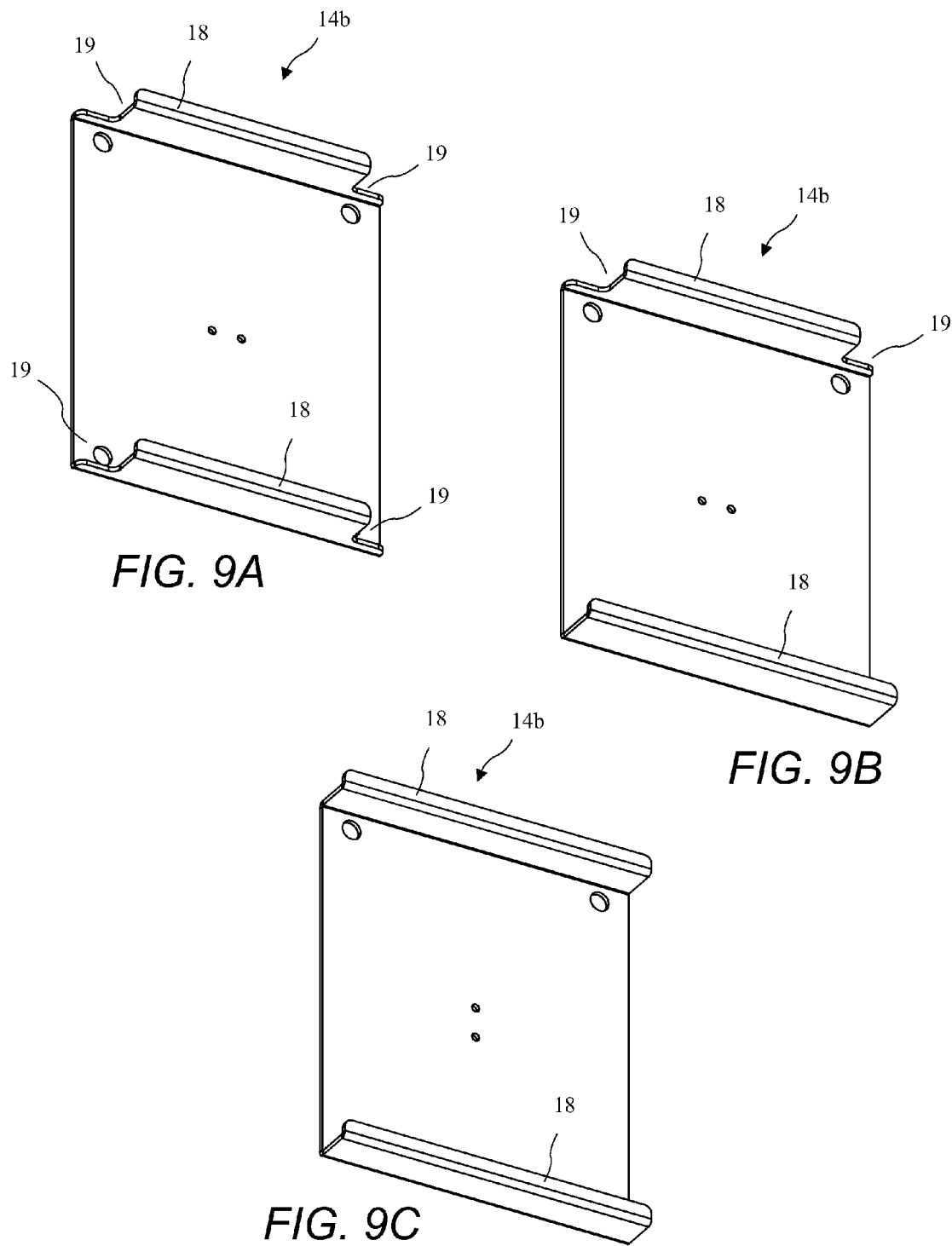
FIG. 9A shows a clamping member having notches on opposite ends of top and bottom inner lips according to the present invention.
FIG. 9B shows a clamping member having notches on opposite ends of the top inner lip only, according to the present invention.
FIG. 9C shows a clamping member without notches on opposite ends of the inner lips, according to the present invention.

A clamping member 14b having notches 19 on opposite ends of top and bottom inner lips 18 is shown in FIG. 9A, a clamping member 14b having notches 19 on opposite ends of the top inner lips 18 is shown in FIG. 9B, and a clamping member 14b without notches 19 on opposite ends of the inner lips 18 is shown in FIG. 9C. The notches 19 are provided to allow wider spacing of the screws 20 (see FIGS. 5, 6A, and 6B).

Figure 10:
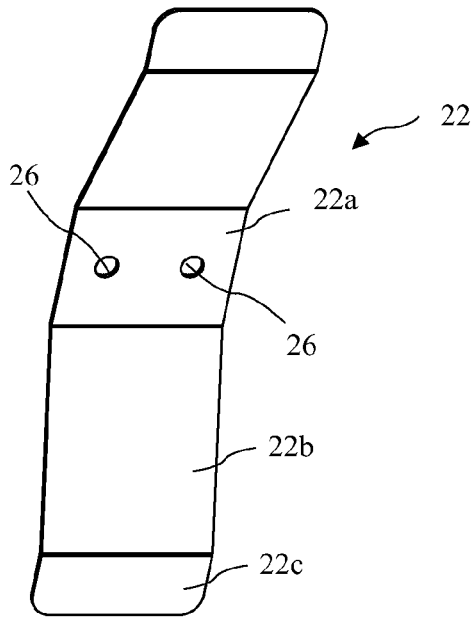
FIG. 10 shows a perspective view of a spring member for biasing the cover and clamping members apart, according to the present invention.
Figure 11C:
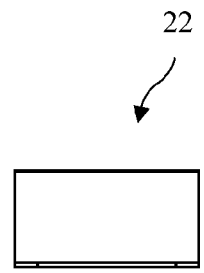
FIG. 11C shows a top view of the spring member according to the present invention.
Figure 11B:
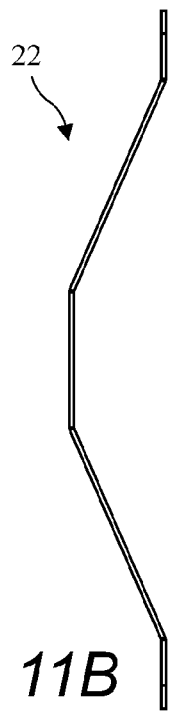
FIG. 11B shows a side view of the spring member according to the present invention.
Figure 11A:
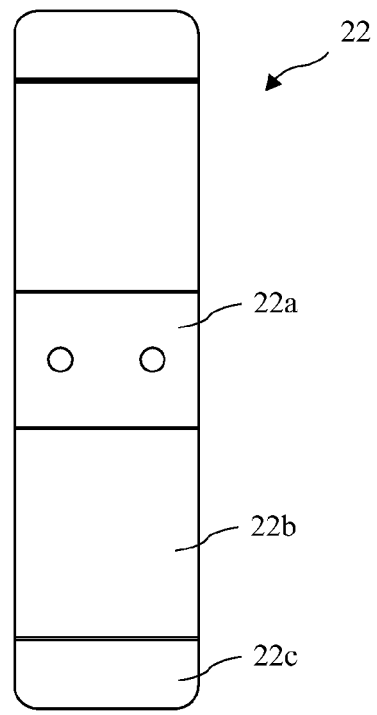
FIG. 11A shows a front view of the spring member according to the present invention.

A perspective view of the spring member 22 for biasing the cover 12a, 14a and clamping members 12b, 14b apart is shown in FIG. 10, a front view of the spring member 22 is shown in FIG. 11A, a side view of the spring member 22 is shown in FIG. 11B, and a top view of the spring member 22 is shown in FIG. 11C.

Figure 12:
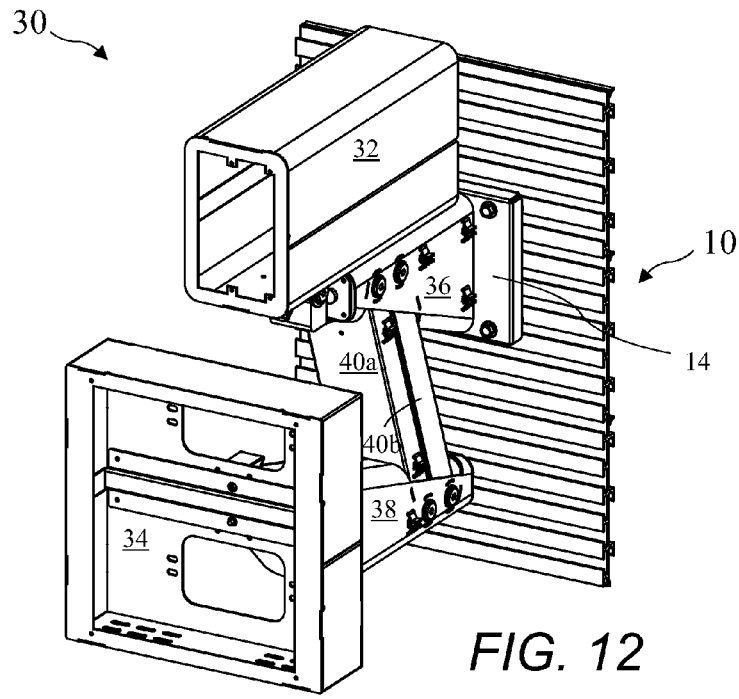
FIG. 12 is a perspective view of a Touch Entry Device (TED) mount according to the present invention in a rearward position.
Figure 13A:
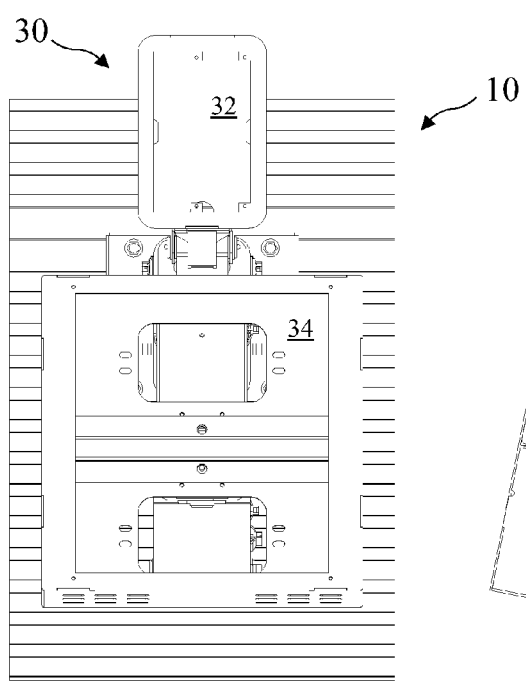
FIG. 13A is a front of the TED mount according to the present invention in a rearward position.
Figure 13B:
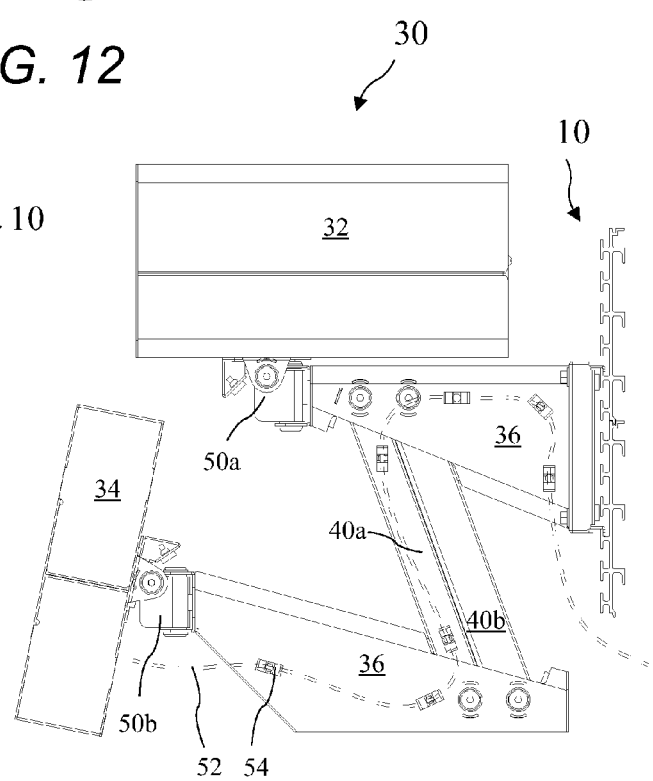
FIG. 13B is a side of the TED mount according to the present invention in a rearward position.

A perspective view of a Touch Entry Device (TED) mount 30 according to the present invention in a rearward position is shown in FIG. 12, a front view of the TED mount 30 in a rearward position is shown in FIG. 13A, and a side view of the TED mount 30 in a rearward position is shown in FIG. 13B. The TED mount 30 includes five major elements, a hanger 36, a carrier 38, a equipment box 32, a display housing 34, and front and rear vertically pivoting arms 40a and 40b respectively. The equipment box 32 is attached to the hanger 36 by a first pivot block 50a and the display housing is attached to the carrier 36 by a second pivot block 50b. Cables 52 are attached to the hanger 36, front arm 40a, and carrier 36 by clips 54. The vertically pivoting arms 40a and 40b pivot on horizontal axles 60 (see FIGS. 23, 24a, and 25).

The TED mount 30 is preferably mounted to the slatwall 10 using the clamping member 14, but may be mounted to the slatwall 10 using any mounting, and may be mounted to other support structure, and a TED mount 30 mounted to any support using any mounting is intended to come within the scope of the present invention.

A perspective view of the TED mount 30 according to the present invention in a forward position is shown in FIG. 14, a front of the TED mount 30 in a forward position is shown in FIG. 15A, and a side of the TED mount 30 in a forward position is shown in FIG. 15B. The vertically pivoting geometry of the pivot arms 40a, 40b allows the display housing 34 to be moved forward and rearward, with negligible vertical movement because the pivot arms 40a, 40b pivot between very small angles. Other mounts, such as a slide mount and a horizontally pivoting mount, were considered, but neither provides the strength or stability of the pivot arms 40a, 40b. The arms 40a, 40b pivot through a vertical position moving from the rearward position in FIG. 13B to the forward position in FIG. 15B.

The hanger 36 includes a pair of stops 72a to limit the movement of the arms 40a and 40b. The stops 72a preferably include rubber bumpers for contact with the arms 40a and 40b. The carrier 38 similarly includes stops 72b. A first pivot stop 70a resided in front of pivot block 50a to limit vertical movement of the equipment box 32 and a second pivot stop 70b resided above pivot block 50b to limit vertical movement of the display housing 34.

Figure 16:
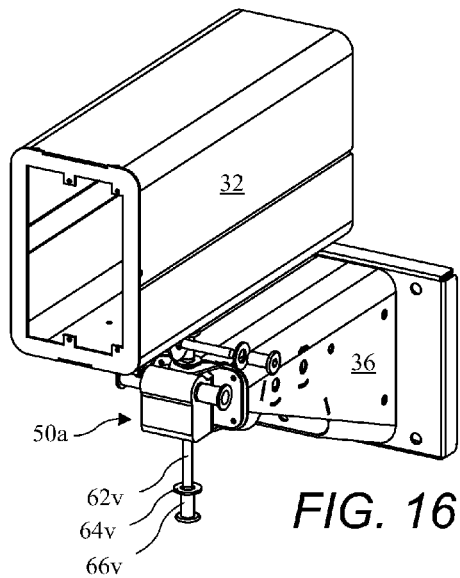
FIG. 16 is a perspective view of a hanger element and equipment box of the TED mount according to the present invention.
Figure 17A:
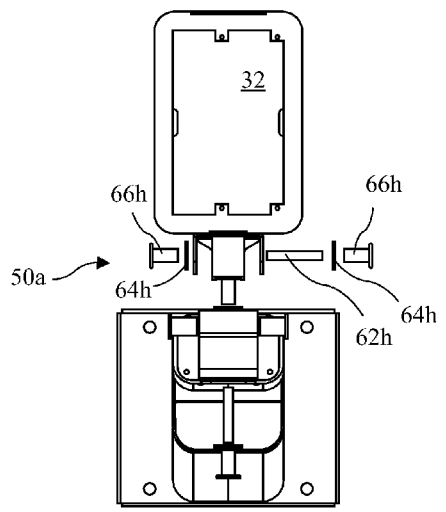
FIG. 17A is a front view of the hanger element and the equipment box of the TED mount according to the present invention.
Figure 17B:
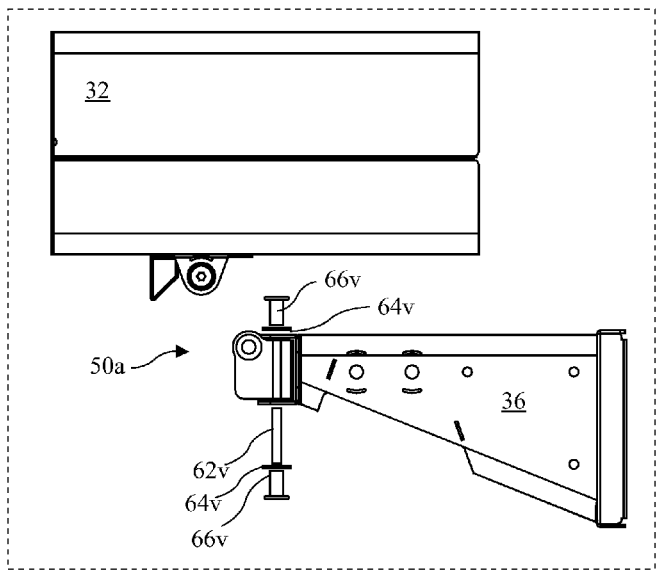
FIG. 17B is a side view of the hanger element and the equipment box of the TED mount according to the present invention.
Figure 18D:
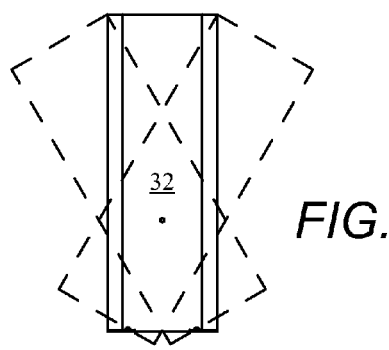
FIG. 18D is a top view of the equipment box of the TED mount according to the present invention.
Figure 18A:
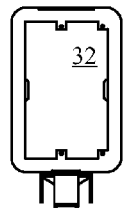
FIG. 18A is a front view of the equipment box of the TED mount according to the present invention.
Figure 18B:
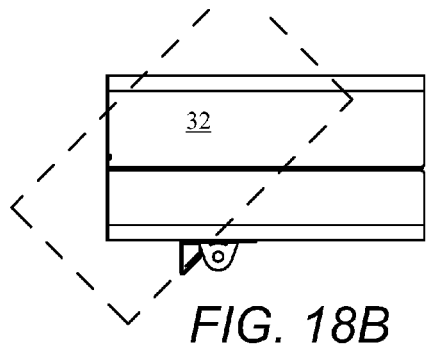
FIG. 18B is a side view of the equipment box of the TED mount according to the present invention.
Figure 18C:
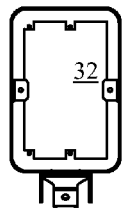
FIG. 18C is a rear view of the equipment box of the TED mount according to the present invention.

A perspective view of the hanger 36 and equipment box 32 of the TED mount 30 is shown in FIG. 16, a front view of the hanger 36 and equipment box 32 of the TED mount 30 is shown in FIG. 17A, and a side view of the hanger 36 and equipment box 32 of the TED mount 30 is shown in FIG. 17B. Front, side, rear, and top views of the equipment box 32 are shown in FIGS. 18A-18D respectively. The equipment box 32 is connected to the hanger 36 by the pivot block 50a providing both rotation (see FIG. 18D) and tilt (see FIG. 18B) of the equipment box 32. A vertical axle of the pivot block 50a is composed of a threaded rod 62v, a pair of plain bearings 64v and a pair of flange barrel nuts 66v. The flange barrel nuts 66v provide axial bearings and the friction adjustments for the pivot block 50a. Similarly, the horizontal axle of the pivot block 50a is composed of a threaded rod 62h, a pair of plain bearings 64h and a pair of flange barrel nuts 66h. The pivot block 50b has similar construction. Additional details of an adjustable axle according to the present invention are shown in FIG. 25.

Figure 19A:
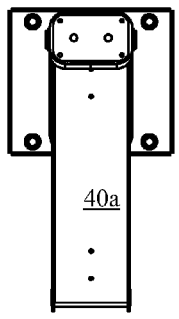
FIG. 19A is a front view of the carrier and pivot arms of the TED mount according to the present invention.
Figure 19B:
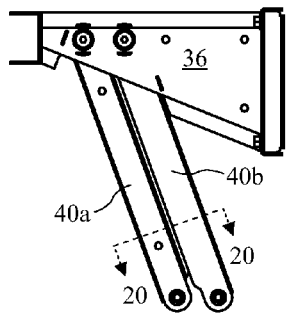
FIG. 19B is a side view of the carrier and pivot arms of the TED mount according to the present invention.
Figure 20:
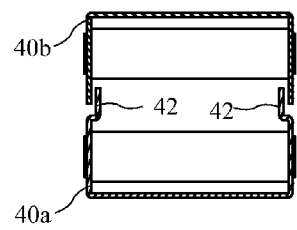
FIG. 20 is a cross-sectional view of the pivot arms of the TED mount according to the present invention taken along line 20-20 of FIG. 19B.

A front view of the carrier 36 and pivot arms 40a and 40b of the TED mount 30 is shown in FIG. 19A, a side view of the carrier 36 and pivot arms 40a and 40b of the TED mount 30 is shown in FIG. 19B, and a cross-sectional view of the carrier 36 and pivot arms 40a and 40b of the TED mount 30 taken along line 20-20 of FIG. 19B is shown in FIG. 20. The arms 40a and 40b are parallel and the arm 40a includes lips 42 overlapped by the arm 40b preventing material from entering the space between the arms 40a and 40b.

Figure 21C:
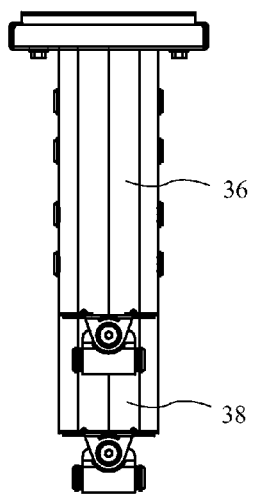
FIG. 21C is a top view of the carrier, the pivot arms, and the hanger of the TED mount according to the present invention.
Figure 22:
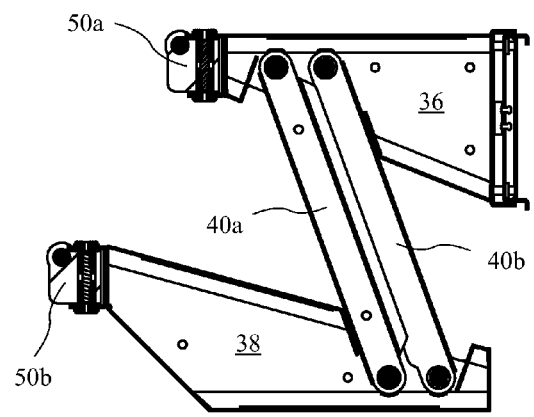
FIG. 22 is a cross-sectional view of the carrier, the pivot arms, and the hanger of the TED mount according to the present invention taken along line 22-22 of FIG. 21A.
Figure 21A:
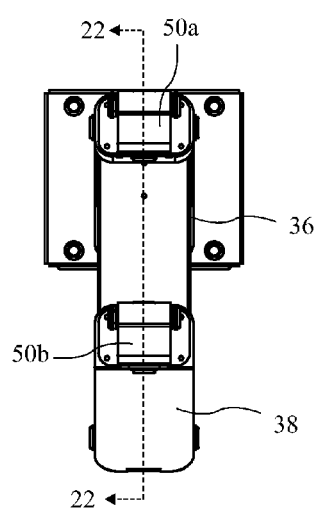
FIG. 21A is a front view of a carrier, the pivot arms, and the hanger of the TED mount according to the present invention.
Figure 21B:
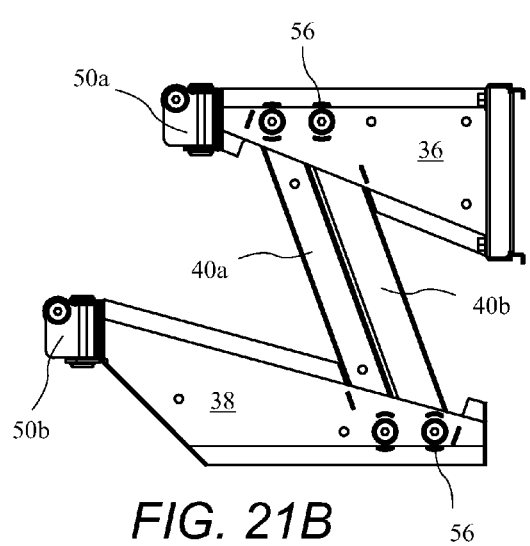
FIG. 21B is a side view of the carrier, the pivot arms, and the hanger of the TED mount according to the present invention.

A front view of the carrier 38, the pivot arms 40a and 40b, and the hanger 36 of the TED mount 30 is shown in FIG. 21A, a side view of the carrier 38, the pivot arms 40a and 40b, and the hanger 36 of the TED mount 30 is shown in FIG. 21B, a top view of the carrier 38, the pivot arms 40a and 40b, and the hanger 36 of the TED mount 30 is shown in FIG. 21C, and a cross-sectional view of the carrier 38, the pivot arms 40a and 40b, and the hanger 36 of the TED mount 30 taken along line 22-22 of FIG. 21A is shown in FIG. 22. Arcs 56 are cut into sides of the carrier 38 and hanger 36 on opposite side of axles (see FIGS. 23, 24A, and 24B) to allow axle stays 44 to be adjusted to control motion of the TED mount 30.

A perspective view of the carrier 38, the equipment box 32, the front pivot arm 40a, and a front arm pivot axle 48 of the TED mount 30 is shown in FIG. 23, a front view of the carrier 38, the equipment box 32, the front pivot arm 40a, and a front arm axle 60 (see FIG. 25) of the TED mount 30 is shown in FIG. 24A, and a side view of the carrier 38, the equipment box 32, the front pivot arm 40a, and the front arm axle 60 of the TED mount 30 is shown in FIG. 24B. A more detailed view of an axle 60 according to the present invention is shown in FIG. 25. The axle 60 comprises a threaded rod 62, a pair of plain bearings 64 and a pair of flange barrel nuts 66. The flange barrel nuts 66 may be tightened or loosened on the threaded rod 62 to increase or decrease resistance of movement of the arms 40a, 40b. For example, the flange barrel nuts 66 may be configured for a slot screwdriver, a phillips screw driver, and allen wrench, a square drive, or any tightening tool. The axles at the lower end of the arms 40a and 40b, and in the pivot block 50a, 50b are preferably of similar design having the same function, only varying in dimensions.

A front view of a display housing 34 is shown in FIG. 26A, a side view of a display housing 34 is shown in FIG. 26B, a rear view of a display housing 34 is shown in FIG. 26C, and a top view of a display housing 34 is shown in FIG. 26D. The display housing 34 is connected to the carrier 38 by the pivot block 50b allowing rotation (see FIG. 2D) and tilt (see FIG. 26B) of the equipment box 32.

While the invention herein disclosed has been described by means of specific embodiments and applications thereof, numerous modifications and variations could be made thereto by those skilled in the art without departing from the scope of the invention set forth in the claims.

We claim:

1. A touch entry display mount comprising:
   a hanger attachable to a wall and extending out from the wall;
   a pair of parallel vertically pivoting arms connected at top ends to the hanger by a pair of first horizontal axles;
   a carrier moveable forward and rearward and connected to bottom ends of the arms by a pair of second horizontal axles, the arms vertically pivotable through a vertical position to move the carrier forward and rearward; and
   a display housing mounted to the carrier,
   wherein the hanger has a triangular vertical cross-section with a wide base against the wall for stability and narrowing away from the wall to provide clearance for the display mount in the rearward position.

2. The touch entry display mount of claim 1, wherein the display mount is mounted to the carrier by a pivot block providing a horizontal pivot of the display mount.

3. The touch entry display mount of claim 1, wherein the display mount is mounted to the carrier by a pivot block providing a vertical pivot of the display mount.

4. The touch entry display mount of claim 1, wherein the display mount is mounted to the carrier by a pivot block providing both a vertical and a horizontal pivot for the display mount.

5. The touch entry display mount of claim 1, wherein the arms are attached to the hanger and the carrier by adjustable axles allowing adjustment of a resistance to rotation of the arms.

6. The touch entry display mount of claim 1, wherein the arms are equal length.

7. The touch entry display mount of claim 1, further including an equipment box attached to the hanger.

8. The touch entry display mount of claim 1, wherein an equipment box is pivotally attached to the hanger at an end opposite the wall.

9. A touch entry display mount comprising:
   a hanger attachable to a wall and extending out from the wall;
   a pair of parallel vertically pivoting arms connected at top ends to the hanger by a pair of first horizontal axles;
   a carrier moveable forward and rearward and connected to bottom ends of the arms by a pair of second horizontal axles, the arms vertically pivotable through a vertical position to move the carrier forward and rearward; and
   a display housing mounted to the carrier,
   wherein one of the arms includes offset lips overlapping the other arms in all positions of the arms.

10. A touch entry display mount comprising:
    a hanger attachable to a wall and extending out from the wall;
    a pair of parallel vertically pivoting arms connected at top ends to the hanger by a pair of first horizontal axles;
    a carrier moveable forward and rearward and connected to bottom ends of the arms by a pair of second horizontal axles, the arms vertically pivotable through a vertical position to move the carrier forward and rearward; and
    a display housing mounted to the carrier,
    wherein the hanger is a controlled stress slatwall hanger comprising:
    a cover including at least two outer lips;
    a clamping member residing behind the cover and including at least two inner lips spaced vertically apart a vertical distance to align with two open spaces between slats of a slatwall;
    a biasing member residing between the cover and the clamping member and biasing the cover and the clamping member apart; and
    drawing members attaching the clamping member to the cover and operable to draw the clamping member and cover together sandwiching a vertical face of at least one of the slats of the slatwall to attach the hanger to the slatwall.

11. The touch entry display mount of claim 10, wherein the at least two outer lips comprise a top outer lip along a top edge of the cover and a bottom outer lip and a bottom edge of the cover.

12. The touch entry display mount of claim 11, wherein the top outer lip reaches upward from the top edge of the cover and a bottom outer lip reaches downward from the bottom edge of the cover.

13. The touch entry display mount of claim 12, wherein the inner lip reaches down from a top edge of the clamping member.

14. The touch entry display mount of claim 13, wherein the biasing member is a spring.

15. The touch entry display mount of claim 14, wherein the biasing member is a flat spring.

16. The touch entry display mount of claim 15, wherein the biasing member is attached to the clamping member.

17. The touch entry display mount of claim 16, wherein the drawing members comprise screws proximal to each corner of the cover.

18. A touch entry display mount comprising:
    a hanger attachable to a wall and extending out from the wall and having a triangular vertical cross-section with a wide base against the wall for stability and narrowing away from the wall to provide clearance for the display mount in the rearward position;
    a pair of parallel equal length vertically pivoting arms connected at top ends to the hanger by a pair of first horizontal axles, one of the arms includes offset lips overlapping the other arms in all positions of the arms;
    a carrier moveable forward and rearward and connected to bottom ends of the arms by a pair of second horizontal axles, the arms attached to the hanger and the carrier by adjustable axles allowing adjustment of a resistance to rotation of the arms and vertically pivotable through a vertical position to move the carrier forward and rearward;
    a display housing mounted to the carrier by a pivot block providing both a vertical and a horizontal pivot of the display mount; and
    an equipment box pivotally attached to the hanger at an end opposite the wall.

19. A touch entry display mount comprising:
    a controlled stress slatwall hanger attachable to a slatwall and extending out from the wall and having a triangular vertical cross-section with a wide base against the wall for stability and narrowing away from the wall to provide clearance for the display mount in the rearward position, the hanger comprising:
    a cover including at least two outer lips;
    a clamping member residing behind the cover and including at least two inner lips spaced vertically apart a vertical distance to align with two open spaces between slats of a slatwall;
    a biasing member residing between the cover and the clamping member and biasing the cover and the clamping member apart; and
    drawing members attaching the clamping member to the cover and operable to draw the clamping member and cover together sandwiching a vertical face of at least one of the slats of the slatwall to attach the hanger to the slatwall; and
    a pair of parallel equal length vertically pivoting arms connected at top ends to the hanger by a pair of first horizontal axles, one of the arms includes offset lips overlapping the other arms in all positions of the arms;
    a carrier moveable forward and rearward and connected to bottom ends of the arms by a pair of second horizontal axles, the arms attached to the hanger and the carrier by adjustable axles allowing adjustment of a resistance to rotation of the arms and vertically pivotable through a vertical position to move the carrier forward and rearward;
    a display housing mounted to the carrier by a pivot block providing both a vertical and a horizontal pivot of the display mount; and an equipment box pivotally attached to the hanger at an end opposite the wall.

* * * * *